United States Patent
Nakasu et al.

(10) Patent No.: US 10,162,420 B2
(45) Date of Patent: Dec. 25, 2018

(54) RECOGNITION DEVICE, METHOD, AND STORAGE MEDIUM

(71) Applicant: KABUSHIKI KAISHA TOSHIBA, Minato-ku, Tokyo (JP)

(72) Inventors: Toshiaki Nakasu, Shinagawa Tokyo (JP); Tsukasa Ike, Shinagawa Tokyo (JP); Yasunobu Yamauchi, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/938,276

(22) Filed: Nov. 11, 2015

(65) Prior Publication Data
US 2016/0139675 A1    May 19, 2016

(30) Foreign Application Priority Data

Nov. 17, 2014    (JP) .................................. 2014-232976

(51) Int. Cl.
*G06F 3/01*    (2006.01)
(52) U.S. Cl.
CPC .................... *G06F 3/017* (2013.01)
(58) Field of Classification Search
CPC ....................................................... G06F 3/017
USPC ........................................................ 345/156
See application file for complete search history.

(56) References Cited

U.S. PATENT DOCUMENTS

| 7,038,658 B2 | 5/2006 | Seki et al. |
| 7,427,979 B2 | 9/2008 | Park et al. |
| 8,965,113 B2 | 2/2015 | Nakasu et al. |
| 2010/0066664 A1* | 3/2010 | Son .................. G06F 1/163 |
| | | 345/156 |

(Continued)

FOREIGN PATENT DOCUMENTS

| JP | H 07-152870 A | 6/1995 |
| JP | H 07-271506 | 10/1995 |

(Continued)

OTHER PUBLICATIONS

Madgwick, S., et al., "Estimation of IMU and MARG Orientation Using a Gradient Descent Algorithm", 2011 IEEE International Conference on Rehabilitation Robotics, Jun. 2011, 7 pgs.

(Continued)

*Primary Examiner* — Nicholas Lee
*Assistant Examiner* — Ngan T Pham Lu
(74) *Attorney, Agent, or Firm* — Knobbe, Martens, Olson & Bear, LLP

(57) ABSTRACT

A recognition device according to an embodiment described herein includes a hardware processor. The hardware processor generates a trajectory of a pointer based at least in part on information relating to a movement of the pointer, detects that the pointer contacts an operation surface, determines a detection time when the pointer contacts the operation surface, and determines a detection position of the pointer at the detection time, sets the detection position as a starting point, determines an ending point corresponding to the starting point based on at least the detection time or the (Continued)

detection position, and sets the trajectory from the starting point to the ending point as a target trajectory, and determines a command input by a user with a gesture of the pointer based on the target trajectory.

20 Claims, 14 Drawing Sheets

(56) References Cited

U.S. PATENT DOCUMENTS

| | | | |
|---|---|---|---|
| 2010/0219989 A1* | 9/2010 | Asami | G06F 3/014 |
| | | | 341/20 |
| 2011/0161888 A1* | 6/2011 | Ito | G06F 3/04883 |
| | | | 715/856 |
| 2012/0019485 A1* | 1/2012 | Sato | G06F 3/017 |
| | | | 345/175 |
| 2012/0105613 A1 | 5/2012 | Weng et al. | |
| 2012/0317516 A1 | 12/2012 | Ohsumi | |
| 2013/0069867 A1 | 3/2013 | Watanabe | |
| 2009/2749111 | 8/2014 | Ohashi et al. | |
| 2015/0138075 A1 | 5/2015 | Nakasu et al. | |
| 2016/0077608 A1 | 3/2016 | Nakasu et al. | |
| 2017/0017303 A1 | 1/2017 | Nakasu et al. | |

FOREIGN PATENT DOCUMENTS

| | | |
|---|---|---|
| JP | H08-328645 A | 12/1996 |
| JP | 2004-054390 | 2/2004 |
| JP | 2004-258837 A | 9/2004 |
| JP | 2007-130367 A | 5/2007 |
| JP | 2007-194958 | 8/2007 |
| JP | 4474529 B2 | 6/2010 |
| JP | 2011-118629 A | 6/2011 |
| JP | 2012-089083 A | 5/2012 |
| JP | 2013-030134 | 2/2013 |
| JP | 2013-175113 | 9/2013 |
| JP | 2014-063318 A | 4/2014 |
| JP | 2015-099574 | 5/2015 |
| JP | 2016-062274 A | 4/2016 |
| JP | 2016-095795 A | 5/2016 |

OTHER PUBLICATIONS

Extended European Search Report dated Mar. 15, 2016 in correspondin European Application No. 15183780.4-1972, 8 pgs.

* cited by examiner

RECOGNITION DEVICE, METHOD, AND STORAGE MEDIUM

CROSS REFERENCE TO RELATED APPLICATION(S)

This application is based upon and claims the benefit of priority from the prior Japanese Patent Application No. 2014-232976, filed on Nov. 17, 2014, the entire contents of which are incorporated herein by reference.

FIELD

Embodiments described herein relate generally to a recognition device, method, and storage medium.

BACKGROUND

Conventionally, a technique is known which can recognize user's gesture by analyzing sensor data of an acceleration sensor and the like. A user can input a command in accordance with the gesture by moving a finger on an arbitrary operation surface by using this recognition technique. As a method for recognizing a gesture on the arbitrary operation surface, a method is proposed in which a signal by pressing down, tracing, and lifting a finger wearing a sensor.

However, in the above-described conventional gesture recognition method, it is difficult to correctly recognize a gesture since the gesture on an operation surface is incorrectly recognized in the case of incorrectly detecting pressing down and lifting a finger.

DETAILED DESCRIPTION

Figure 1:
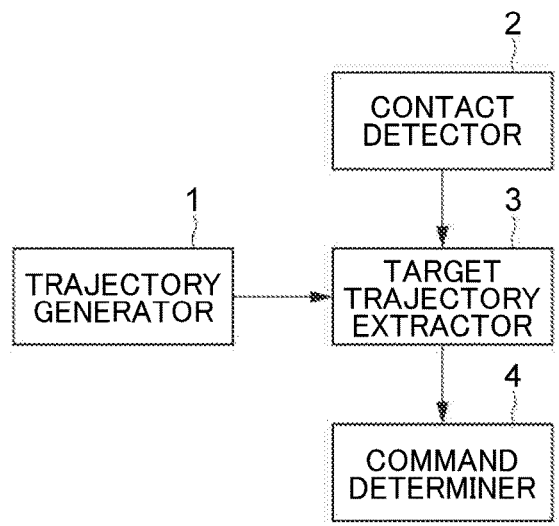
FIG. 1 is a block diagram illustrating a function configuration of a recognition device according to a first embodiment.

Embodiments will now be explained with reference to the accompanying drawings. The present invention is not limited to the embodiments.

A recognition device according to an embodiment described herein includes a hardware processor. The hardware processor generates a trajectory of a pointer based at least in part on information relating to a movement of the pointer, detects that the pointer contacts an operation surface, determines a detection time when the pointer contacts the operation surface, and determines a detection position of the pointer at the detection time, sets the detection position as a starting point, determines an ending point corresponding to the starting point based on at least the detection time or the detection position, and sets the trajectory from the starting point to the ending point as a target trajectory, and determines a command input by a user with a gesture of the pointer based on the target trajectory.

A recognition device according to each of the embodiments to be described below recognizes a gesture by a pointer of a user on an operation surface based on movement information on the pointer and outputs a command in accordance with the gesture.

The pointer is an arbitrary means, and a user moves the pointer on an operation surface to input a command. Examples of the pointer include a specific part of the body, a pen, and a touch pen. Examples of the specific part include, but are not limited to, a finger, an arm, a wrist, a head, a thigh, a toe, and an ankle.

The pointer is selected in accordance with an application of the recognition device. In the case of an application for handwriting a character, a finger and a pen are preferably used as the pointer. In addition, a toe is preferably used as the pointer while driving a car. A vehicle-mounted air conditioner and car navigation system can be safely operated by inputting a gesture command by a toe. A method for using the recognition device will be described in detail later.

The movement information is information indicating movement. Examples of the movement information include, but are not limited to, acceleration, angular velocity, and terrestrial magnetism. As the movement information, time series sensor data of a movement information sensor can be used, Examples of the movement information sensor include, but are not limited to, an acceleration sensor, an angular velocity sensor, and a terrestrial magnetism sensor. As the movement information sensor, a commercially available nine-axis sensor can be used.

The movement information sensor is configured to be wearable on the pointer. Therefore, the movement information sensor is selected depending on the pointer. For example, in the case where the pointer is user's finger, a ring-type sensor is used as the movement information sensor. Further, in the case where the pointer is an arm, a bracelet-type sensor and a glove-type sensor are used as the movement information sensor.

Although the recognition device preferably obtains movement information by wireless communication from the movement information sensor, it can include the movement information sensor. In the case where the recognition device includes the movement information sensor, the recognition device is configured to be wearable on a pointer. For example, in the case where the pointer is user's finger, the recognition device is configured as a ring-type wearable terminal. Further, in the case where the pointer is an arm, the recognition device is configured as a bracelet-type and a glove-type wearable terminal.

The operation surface is an arbitrary surface on which the pointer is contacted to input a command by a gesture of a user. Examples of the operation surface include, but are not limited to, a palm, a back of a hand, an arm, a thigh, a table, a wall surface, and a floor surface.

The gesture means movement of the pointer on the operation surface to input a command. Examples of the gesture include specific movement on the operation surface (for example, tapping and flicking) and movement for inputting a character and a figure (hereinafter called characters) by handwriting. The recognition device recognizes the gesture as a trajectory of the pointer on the operation surface.

Examples of the command include an order to a computer corresponding to the gesture and the characters input by the gesture. The recognition device determines the command input by a user by recognizing the gesture.

In the description below, the pointer is assumed to be user's finger, but it is not limited thereto as described above.

First Embodiment

A recognition device, method, and storage medium according to a first embodiment will be described with reference to FIGS. 1 to 11. The recognition device according to the embodiment determines a gesture command input by user's gesture. The gesture command is an order to a computer corresponding to a specific gesture such as tapping and flicking.

First, a function configuration of the recognition device according to the embodiment will be described with reference to FIGS. 1 to 8. FIG. 1 is a block diagram illustrating a function configuration of the recognition device according to the embodiment. As illustrated in FIG. 1, the recognition device includes a trajectory generator 1, a contact detector 2, a target trajectory extractor 3, and a command determiner 4.

The trajectory generator 1 (hereinafter called a generator 1) generates a trajectory of a finger based on movement information on user's finger. The generator 1 generates a finger trajectory, for example, based on sensor data of a ring-type movement information sensor. Specifically, the generator 1 obtains finger movement information and calculates a finger position p at each time t based on the obtained movement information.

Figure 2:
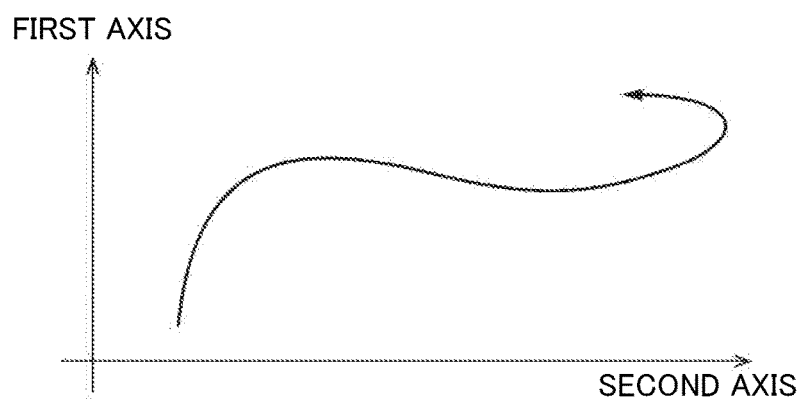
FIG. 2 is a diagram illustrating an example of movement of a finger.
Figure 3:
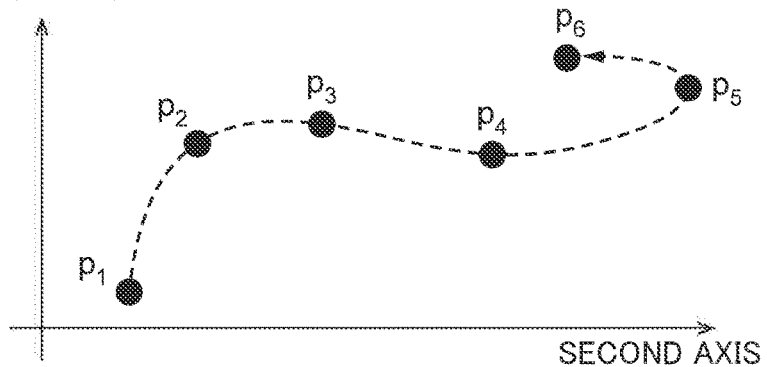
FIG. 3 is a diagram illustrating an example of a trajectory generated with respect to the movement illustrated in FIG. 2.

For example, in the case where a finger moves as illustrated in FIG. 2, and the generator 1 obtains movement information at each of times $t_1$ to $t_6$ during the movement, the generator 1 calculates finger positions $p_1$ to $p_6$ at the times $t_1$ to $t_6$ respectively as illustrated in FIG. 3. The generator 1 outputs a sequence of the calculated positions p as a finger trajectory. Specifically, a finger trajectory is generated as a sequence of the finger positions p as illustrated in FIG. 3.

The generator 1 may generate a trajectory by complementing between the calculated positions p. Thus, a trajectory indicated by a dotted line in FIG. 3 can be generated from the calculated positions $p_1$ to $p_6$.

The finger position p is calculated by associating three-dimensional tilt of a finger with a corresponding position on a predetermined plane. The generator 1 first sets a coordinate axis based on tilt of a finger in a standard state to calculate the position p.

Figure 4:
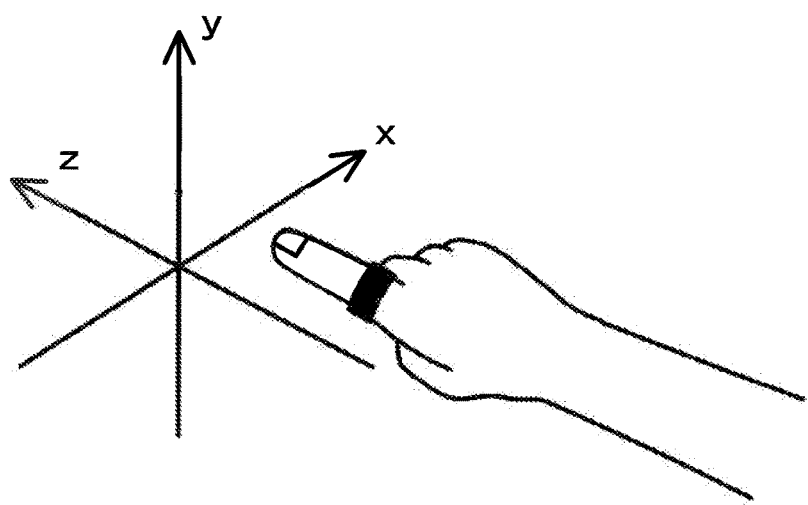
FIG. 4 is a view describing a method for setting a coordinate axis.

FIG. 4 is a view illustrating an example of the set coordinate axis. In the coordinate axis illustrated in FIG. 4, a z axis indicates the direction of a fingertip in a standard state, a y axis indicates the direction from a finger cushion side to a backside of a hand, and an x axis indicates the direction vertical to the y axis and the z axis. However, a method for setting the coordinate axis is not limited thereto.

The generator 1 calculates tilt of a finger at this coordinate axis after setting the coordinate axis, and calculates, as the position p, an intersection between a straight line based on the tilt of the finger and a predetermined plane. For example, in FIG. 4, in the case where the predetermined plane is an xy plane, the intersection between the straight line based on tilt of a finger and the xy plane is the finger position p. A first axis and a second axis in FIGS. 2 and 3 can be respectively corresponded to the x axis and the y axis in FIG. 4.

The standard state means a finger state at a predetermined timing. The predetermined timing is, for example, a timing in which a recognition program starts a recognition process and a timing in which a predetermined signal is input to a recognition device by voice input and pushing down a button.

Further, the predetermined timing may be a timing in which gesture start is detected. The timing in which the gesture start is detected may be, for example, a timing in which the contact detector 2 to be described later detects contact of a finger to an operation surface.

Furthermore, the predetermined timing may be a timing in which a predetermined shape, posture, and angle of a finger (hereinafter called shapes) are continuously detected for a certain period of time. For example, the generator 1 can set a coordinate axis as a standard state in the case where the finger shapes as illustrated in FIG. 4 are continuously detected for a certain period of time.

Three-dimensional tilt of a finger on the coordinate axis is, for example, expressed by a pitch, a yaw, and a roll based on tilt of a finger in the standard state.

Figure 5:
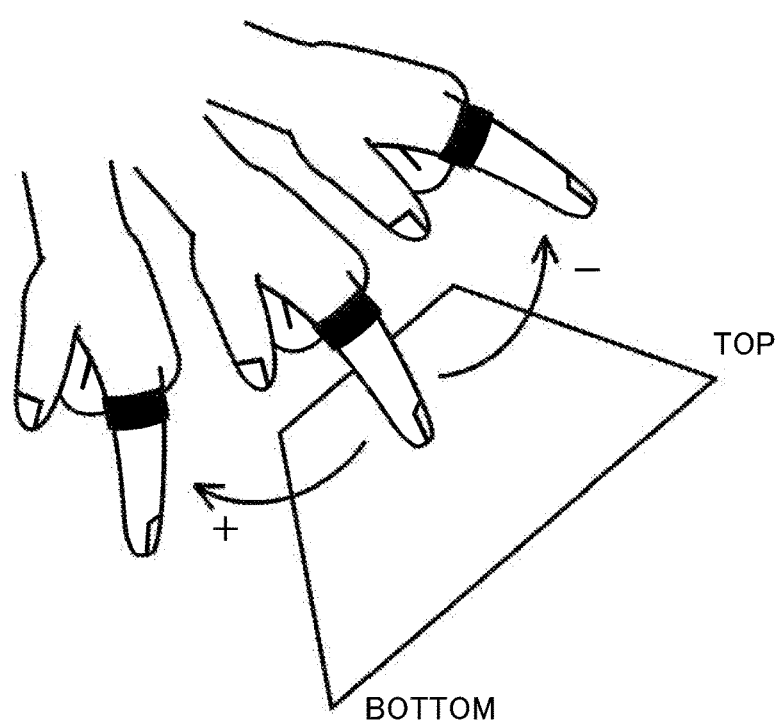
FIG. 5 is a view describing a pitch.
Figure 6:
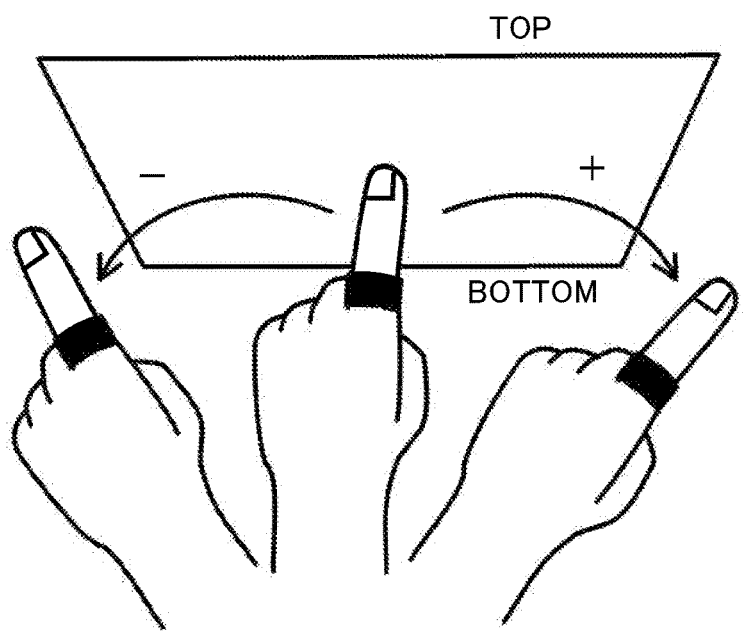
FIG. 6 is a view describing a yaw.

The pitch is a vertical rotation angle in which a horizontal direction of a finger in the standard state is set as an axis as illustrated in FIG. 5. The yaw is a horizontal rotation angle in which a vertical direction of a finger in the standard state is set as an axis as illustrated in FIG. 6. The roll is a rotation angle in which a front and back direction of a finger in the standard state is set as an axis as illustrated in FIG. 7.

Figure 7:
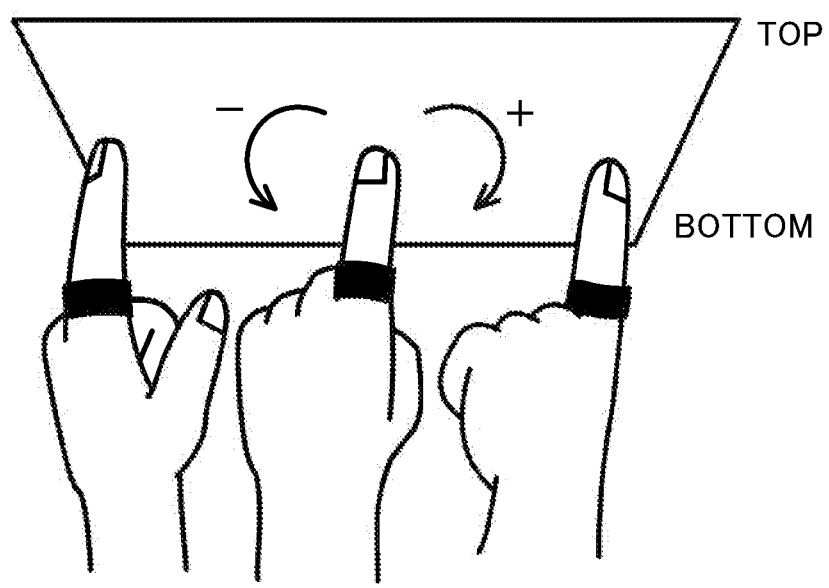
FIG. 7 is a view describing a roll.

In FIGS. 5 to 7, positive directions of the pitch, yaw, and roll are respectively a lower direction, a right direction, and a clockwise. However, those may be reversed. The pitch, yaw, and roll can be calculated based on movement information on acceleration, angular velocity, terrestrial magnetism and the like.

The contact detector 2 (hereinafter called a detector 2) detects contact of a finger to an operation surface. The detector 2 detects the contact, for example, based on sensor data of a pressure sensor and a myoelectric sensor (hereinafter called pressure sensors) attached to and around a finger. Specifically, the detector 2 detects the contact by comparing an output value of the pressure sensors with a predetermined threshold and by comparing an output waveform pattern with a pattern at the contact. Although the recognition device preferably acquires sensor data by wireless communication with the pressure sensors, it can include the pressure sensors.

Figure 8:
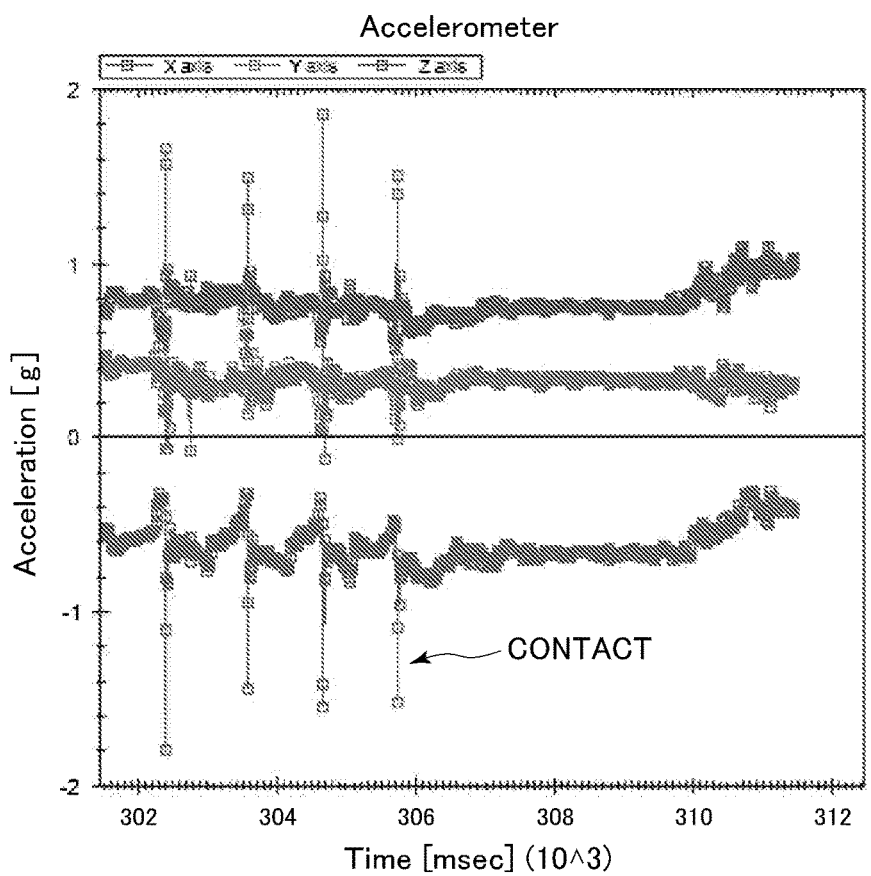
FIG. 8 is a graph illustrating an example of sensor data of an acceleration sensor.

In addition, the detector 2 may detect contact based on movement information. Herein, FIG. 8 is a graph illustrating an example of sensor data of an acceleration sensor. As illustrated in FIG. 8, when a finger comes into contact with an operation surface, an acceleration waveform steeply changes, and a pulse waveform is formed. Therefore, the detector 2 can detect contact by detecting the acceleration pulse waveform. More specifically, the detector 2 may detect the contact based on a first condition and a second condition to be described below.

The first condition is a condition that a change amount of the acceleration is equal to or greater than a predetermined threshold "$A_1$" in the case where an average value of the acceleration in a predetermined time in the past is set as a reference value.

The second condition is a condition that, in the case where a time at which a change amount of the acceleration from the reference value becomes maximum is indicated as "$T_{max}$", and predetermined time intervals are indicated as "$T_1$" and "$T_2$", the amount of change in the acceleration from a time "$T_{max}-T_2$" to a time "$T_{max}-T_1$" and the acceleration from a time "$T_{max}+T_1$" to a time "$T_{max}+T_2$" is less than a predetermine threshold "$A_2$".

The time intervals "$T_1$" and "$T_2$" have a relation of "$T_2>T_1$". Further, the predetermine thresholds "$A_1$" and "$A_2$" have a relation of "$A_1>A_2$". For example, the predetermined threshold "$A_2$" is preferably approximately a half or equal to or less than a half of "$A_1$" and larger than the reference value. A predetermined time in the past is, for example, approximately 100 to 300 milliseconds (ms). In the case where an average value of acceleration in a very long time is set as a reference value, detection might be difficult if a finger repeatedly comes into contact with an operation surface. Therefore, the reference value needs to be appropriately changed by a user specification. Further, "$A_1$" may be defined as, for example, "0.5×gravity acceleration" and may be determined based on a peak value when a finger comes into contact with an operation surface at an initial setting time.

More specifically, an interval from the time "$T_{max}-T_2$" to the time "$T_{max}-T_1$" and an interval from the time "$T_{max}+T_1$" to the time "$T_{max}+T_2$" are a time interval before and after the time "$T_{max}$" at which an amount of change in acceleration becomes maximum.

As described above, an acceleration waveform at contact is detected in a short time, and therefore has a steep shape. Therefore, in the case where a waveform before and after the time when the amount of change in acceleration becomes maximum is similar to a reference value, the detector 2 may determine that a finger comes into contact with an operation surface. By applying the first and second conditions, it is prevented that contact is detected from movement that a finger does not come into contact with the operation surface.

Further, a third condition may be applied in addition to the first and second conditions. The third condition is a condition that a wrist position is fixed within a certain range in a time interval before and after the time "$T_{max}$". In the case where the wrist position can be calculated in time series, the detector 2 can more precisely detect contact by determining the contact by further applying the third condition.

When detecting contact, the detector 2 obtains a time t at which the contact is detected and a finger position p at the time t from the generator 1 as a detection time T and a detection position P.

The target trajectory extractor 3 (hereinafter called an extractor 3) extracts a target trajectory from a finger trajectory generated by the generator 1. User's finger repeats a series of movement that the finger contacts, moves on, and separates from an operation surface and moves at a position away from the operation surface. Therefore, a trajectory generated by the generator 1 includes a trajectory generated when a finger moves on an operation surface and a trajectory generated when a finger moves at a position away from the operation surface. In such trajectories, a target trajectory means a trajectory generated when a finger moves on an operation surface. A recognition device recognizes user's gesture as the target trajectory and determines a command based on the target trajectory.

In the embodiment, the extractor 3 first obtains the detection position P from the detector 2 as a starting point of the target trajectory. Next, the extractor 3 obtains an ending point corresponding to the starting point. The extractor 3 extracts, as the target trajectory, a trajectory from the starting point to the ending point from the trajectory generated by the generator 1. The ending point corresponding to the starting point is an ending point of the target trajectory starting at the starting point.

The extractor 3, for example, obtains the finger position p after a predetermined time $T_3$ from a time of a starting point (the detection time T) as an ending point of the target trajectory. The predetermined time $T_3$ can be arbitrarily set.

Further, the extractor 3 may obtain the finger position p separated at a predetermined distance L from a position of the starting point (the detection position P) as the ending point of the target trajectory.

Furthermore, the extractor 3 obtains a detection position subsequent to the detection position P obtained as the starting point as an ending point corresponding to the detection position P.

A command determiner 4 (hereinafter called a determiner 4) determines a command input by a user based on the target trajectory extracted by the extractor 3 and outputs a determination result. In the embodiment, the determiner 4 determines a gesture command and outputs the determined gesture command.

The determiner 4, for example, determines a gesture command as a tap command in the case where a time (t−T) from a time of a starting point (the detection time T) to a time t of an ending point of a target trajectory is equal to or greater than the predetermined time $T_3$ (t−T≥$T_3$).

In addition, the determiner 4 may determine a gesture command as a flick command in the case where a distance (|p−P|) from a starting point (the detection position P) to an ending point p of a target trajectory is equal to or greater than the predetermined distance L (|p−P|≥L). In this case, the determiner 4 preferably determines a flick direction based on a vector direction from a starting point to an ending point of a target trajectory. The flick direction is, for example, any of an upper direction, a lower direction, a left direction, and a right direction on a predetermined plane. The determiner 4 may determine a direction closest to the vector direction as the flick direction.

Figure 9:
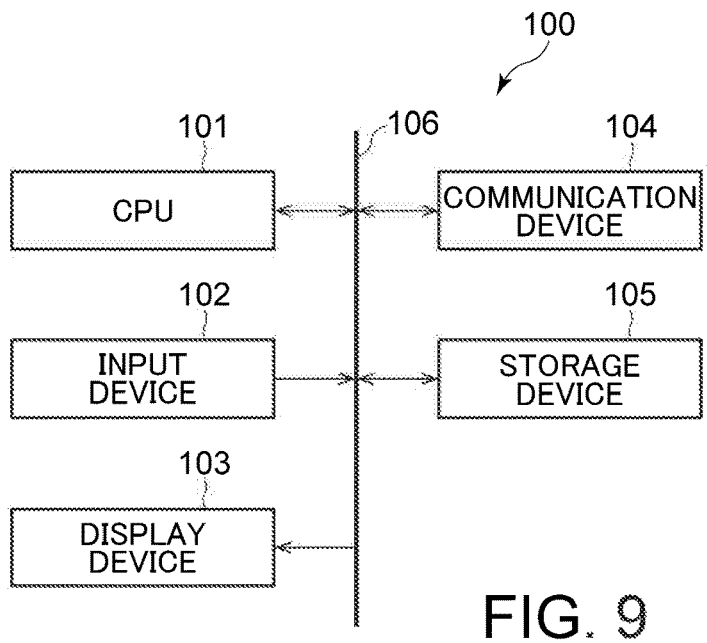
FIG. 9 is a diagram illustrating a hardware configuration of the recognition device according to the first embodiment.

Next, a hardware configuration of the recognition device according to the embodiment will be described with reference to FIG. 9. The recognition device according to the embodiment is configured by a computer 100 as illustrated in FIG. 9. The computer 100 includes a central processing unit (CPU) 101, an input device 102, a display device 103, a communication device 104, a storage device 105. These devices are connected with each other via a bus 106.

The CPU 101 is a control device and a computing device of the computer 100. The CPU 101 performs a computing process based on data and a program input from each device (for example, the input device 102, the communication device 104, and the storage device 105) connected via the bus 106 and outputs a computing result and a control signal to each device (for example, the display device 103, the communication device 104, and the storage device 105) connected via the bus 106.

Specifically, the CPU 101 executes an operating system (OS) of the computer 100, a recognition program and the like and controls each device included in the computer 100. The recognition program is a program for causing the computer 100 to realize the above-described each function configuration of a recognition device. The computer 100 functions as a recognition device when the CPU 101 performs the recognition program.

The input device 102 is a device for inputting information to the computer 100. Examples of the input device 102 include, but are not limited to, a keyboard, a mouse, and a touch panel.

The display device 103 is a device for displaying a picture and an image. Examples of the display device 103 include, but are not limited to, a liquid crystal display (LCD), a cathode ray tube (CRT), a touch panel, and a plasma display panel (PDP). The display device 103 may display information on sensor data of an acceleration sensor and the like, a trajectory generated by the generator 1, a contact detection result by the detector 2, a detection position and a detection time acquired by the detector 2, a target trajectory extracted by the extractor 3, a determination result by the determiner 4, and the like.

The communication device 104 is a device for causing the computer 100 to communicate with an external device by wireless or wired communication. Examples of the communication device 104 include, but are not limited to, a modem, a hub, and a router. Sensor data of a movement information sensor, a pressure sensor and the like can be obtained via the communication device 104.

The storage device 105 is a storage medium for storing an OS of the computer 100, a recognition program, data needed for executing the recognition program, data generated by executing the recognition program, and the like. The storage device 105 includes a main storage and an external storage. Examples of the main storage include, but are not limited to, RAM, DRAM, and SRAM. Examples of the external storage include, but are not limited to, a hard disk, an optical disk, a flash memory, and a magnetic tape. The storage device 105 may store information on sensor data of an acceleration sensor and the like, a trajectory generated by the generator 1, a contact detection result by the detector 2, a detection position and a detection time acquired by the detector 2, a target trajectory extracted by the extractor 3, a determination result by the determiner 4, and the like.

The computer 100 may include one or a plurality of the CPU 101, the input device 102, the display device 103, the communication device 104, and the storage device 105 and may be connected to peripherals such as a printer and a scanner.

Further, a recognition device may be configured by a single computer 100 and may be configured as a system including multiple computers 100 connected with each other.

Furthermore, a recognition program may be stored in the storage device 105 of the computer 100 in advance, may be stored in a storage medium such as a CD-ROM, and may be uploaded on the Internet. In any case, the recognition device can be configured by installing the recognition program in the computer 100 for execution.

In addition, in the case where the recognition device includes a movement information sensor, a pressure sensor and the like, these sensors may be connected via the bus 106.

Figure 10:
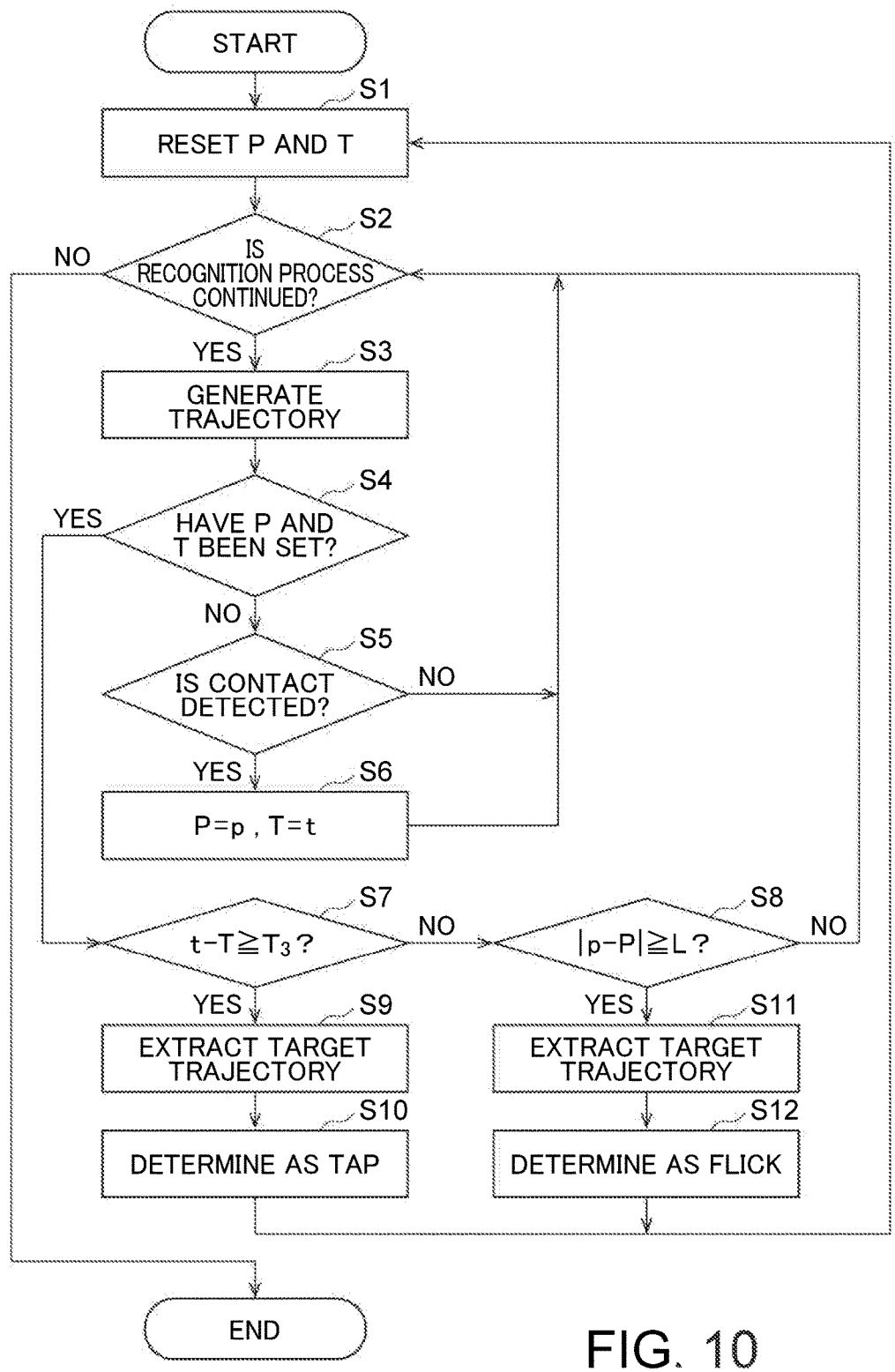
FIG. 10 is a flowchart illustrating processing of the recognition device according to the first embodiment.

Next, processing of the recognition device according to the embodiment will be specifically described with reference to FIG. 10. FIG. 10 is a flowchart illustrating processing of the recognition device according to the embodiment. The case where a gesture command is determined as a flick command or a tap command will be described below.

In step S1, the detector 2 resets the detection position P and the detection time T.

In step S2, the generator 1 determines whether to continue a gesture recognition process. In the case where it is determined not to continue the recognition process (NO in step S2), the recognition process is finished. The recognition process is finished, for example, in the case where the latest sensor data cannot be obtained or in the case where an end signal of the recognition process is input. In the case where the recognition process is continued (YES in step S2), the process proceeds to step S3.

In step S3, the generator 1 generates a finger trajectory by obtaining the latest movement information.

In the case where the detection position P and the detection time T are not set when the generator 1 generates the trajectory (NO in step S4), the process proceeds to step S5.

In step S5, the detector 2 determines whether a finger comes into contact with an operation surface. A method for detecting the contact is as described above. In the case where the detector 2 does not detect the contact (NO in step S5), the process returns to step S2. On the other hand, in the case where the detector 2 detects the contact (YES in step S5), the process proceeds to step S6.

In step S6, from the generator 1, the detector 2 obtains a time t, at which the contact has been detected, as the detection time T (T=t) and obtains the position p at the time t as the detection position P (P=p). In this manner, the detection position P and the detection time T are set. Then, the process returns to step S2.

In the case where the detection position P and the detection time T have been set when the generator 1 has generated a trajectory (YES in step S4), the process proceeds to step S7.

In step S7, the extractor 3 obtains the detection position P and the detection time T as a starting point of a target trajectory from the detector 2. The extractor 3 determines whether a time from the detection time T to a current time t (t−T) is equal to or greater than the predetermined time $T_3$. In the case of less than the predetermined time $T_3$, in other words, in the case of t−T<$T_3$ (NO in step S7), the process proceeds to step S8.

In step S8, the extractor 3 determines whether a distance |p−P| from the detection position P to the current position p is equal to or greater than the predetermined distance L. In the case of less than the predetermined distance L, in other words, in the case of |p−P|<L (NO in step S8), the process returns to step S2.

In step S7, in the case of the predetermined time $T_3$ or more, in other words, in the case of t−T≥$T_3$ (YES in step S7), the process proceeds to step S9.

In step S9, the extractor 3 obtains the position p after the predetermined time $T_3$ from the detection time T as an ending point of a target trajectory from the generator 1 and extracts a trajectory from the detection position P to the obtained position p as a target trajectory. In this case, the extractor 3 may obtain the position p at a current time instead of the position p after the predetermined time $T_3$ from the detection time T.

In step S10, the determiner 4 obtains a target trajectory from the extractor 3 and determines a gesture command. As for the target trajectory obtained herein, a time from the time of a starting point to the time of an ending point is equal to or greater than a predetermined time $T_3$, and a distance from the starting point to the ending point is less than the predetermined distance L. Therefore, the determiner 4 determines the target trajectory as a tap command.

By determining in this manner, after a finger comes into contact with an operation surface, a gesture in which a movement distance of a finger during a certain period of time is small is recognized as a tap, and a tap command can be output. After the determiner 4 outputs a tap command, the process returns to step S1.

In step S8, in the case of the predetermined distance L or more, in other words, in the case of $|p-P|\geq L$ (YES in step S8), the process proceeds to step S11.

In step S11, the extractor 3 obtains the position p separated at the predetermined distance L from the detection position P as an ending point of a target trajectory, and extracts a trajectory from the detection position P to the obtained position p as a target trajectory. In this case, the extractor 3 may obtain the current position p instead of the position p separated at the predetermined distance L from the detection position P.

In step S12, the determiner 4 obtains a target trajectory from the extractor 3 and determines a gesture command. As for the target trajectory obtained herein, a time from the time of a starting point to the time of an ending point is less than the predetermined time $T_3$, and a distance from the starting point to the ending point is the predetermined distance L or more. Therefore, the determiner 4 determines the target trajectory as a flick command.

By determining in this manner, after a finger comes into contact with an operation surface, a gesture in which a movement distance of a finger during a certain period of time is large is recognized as a flick, and a flick command can be output. After the determiner 4 outputs a flick command, the process returns to step S1.

The recognition device recognizes a gesture of a user by repeating the above processing at a predetermined time interval and determines a gesture command input by the user.

As described above, according to the recognition device according to the embodiment, the gesture command can be determined (a gesture can be recognized) by generating a finger trajectory of a user and detecting that user's finger comes into contact with an operation surface. Specifically, the recognition device can determine a gesture command without detecting that user's finger is separated from the operation surface. Therefore, the recognition device according to the embodiment can prevent incorrectly determining a gesture command by incorrectly detecting separation of a finger, and can precisely determine user's gesture command.

Figure 11:
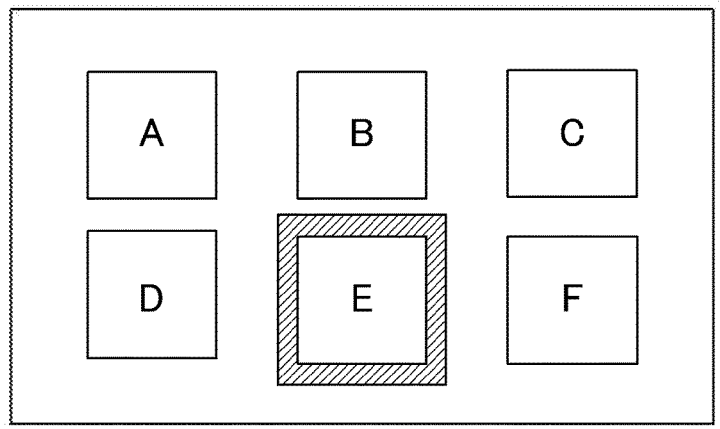
FIG. 11 illustrates an example of a screen of the recognition device according to the first embodiment.

The recognition device according to the embodiment can be used as a device capable of screen operation by a gesture (for example, TV, a computer, and a tablet terminal). FIG. 11 is a diagram illustrating an example of a screen displayed on the display device 103 of the recognition device. In FIG. 11, objects A to F are displayed on the screen, and an object E is selected.

According to the recognition device according to the embodiment, a user can start up an application corresponding to the object E selected on the screen and expand the object E by tapping an operation surface (for example, a palm) by a finger.

Further, the user can change the selected object by flicking the operation surface by the finger. For example, in the case of FIG. 11, a user can select the object B by flicking in an upper direction. Furthermore, a screen may be scrolled depending on a flicking distance and speed.

The display device 103 may be a touch panel. In this case, a user can input a command even in the case where the touch panel is broken down and in the case where a user cannot directly operate the touch panel since his/her hands are covered with gloves.

The recognition device according to the embodiment may include two operation states including an operation mode and a non-operation mode. The operation mode is an operation state in which a recognition device can output a gesture command. The non-operation mode is an operation state in which the recognition device cannot output the gesture command.

In the case where the recognition device can output a gesture command at all times, an unintended gesture command might be output by detecting contact when a user's finger hits a wall or an object. Such incorrect input of a gesture command can be prevented by providing the non-operation mode.

Operation state transition between the operation mode and the non-operation mode may be performed by sending a specific signal to a recognition device by pressing a button or the like, and may be performed by inputting a specific gesture command by an explicit gesture (for example, flicking a predetermined distance or more).

In addition, the determiner 4 may determine a gesture command as a double tap command in the case where a time from the time of a starting point to the time of an ending point of a target trajectory is less than the predetermined time $T_3$, and a distance from the starting point to the ending point of the target trajectory is less than the predetermined distance L.

By determining in this manner, a double tap command can be output by recognizing, as a double tap, a gesture in which a finger repeatedly contacts an operation surface during a certain period of time since the finger has come into contact with the operation surface and a movement distance is small.

Second Embodiment

A recognition device, method, and storage medium according to a second embodiment will be described with reference to FIGS. 12 to 16. The recognition device according to the embodiment determines characters input by user's gesture. Hereinafter, a command is assumed to be a character. However, it may be a figure as described above.

Processing by an extractor 3 and a determiner 4 in the recognition device according to the second embodiment is difference from the processing according to the first embodiment. Other function configuration and hardware configuration are similar to those of the first embodiment. Hereinafter, the extractor 3 and the determiner 4 will be described with reference to FIGS. 12 and 13.

The extractor 3 obtains a detection position P from a detector 2 as a starting point of a target trajectory. The extractor 3 obtains an ending point corresponding to the starting point after the starting point of the target trajectory has been obtained. The extractor 3 extracts a trajectory from the starting point to the ending point from a trajectory generated by a generator 1 as a target trajectory. The ending point corresponding to the starting point is an ending point of a target trajectory starting at the starting point. In the embodiment, a target trajectory is handled as a stroke of a character input by handwriting.

The extractor 3, for example, obtains an ending point of a target trajectory based on a direction of a trajectory after a starting point. Specifically, the extractor 3 obtains, as an ending point corresponding to a starting point, a bending point $P_i'$ of a trajectory immediately before a detection position $P_{i+1}$ subsequent to a detection position $P_i$ obtained as a starting point.

The bending point of a trajectory is a position at which a direction of the trajectory changes at a predetermined angle α or more on the trajectory. The predetermined angle α can be set arbitrarily and, for example, is 90 degrees.

The extractor 3 first calculates a vector $R_i$ from a previous position $p_i$ on a trajectory to a subsequent position $p_{i+1}$ to obtain a bending point. Next, the extractor 3 calculates an angle $θ_i$ formed by a previous vector $R_i$ and a subsequent vector $R_{i+1}$. Then, the extractor 3 obtains the position $p_{i+1}$ as a bending point in the case of $θ_i ≥ α$ in comparison with the angle $θ_i$ and the angle α.

Figure 12:
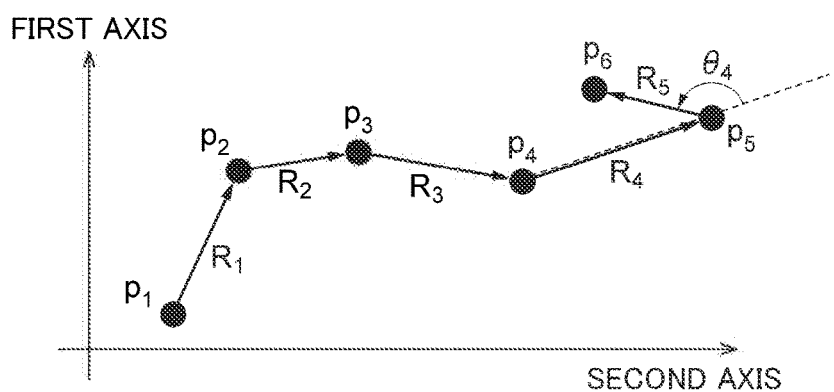
FIG. 12 is a graph describing a method for obtaining bending points.

For example, in the case where a trajectory illustrated in FIG. 12 is generated by the generator 1, the extractor 3 calculates vectors $R_1$ to $R_5$ from the positions $p_1$ to $p_6$ and calculates the angles $θ_1$ to $θ_4$. In the case of $θ_4 ≥ α$, the extractor 3 obtains the position $p_5$ as a bending point.

In the embodiment, the extractor 3 obtains, among the above-described bending points, the bending point $P_i'$ immediately before the detection position $P_{i+1}$ as an ending point corresponding to the detection position $P_i$. The reason therefor is as described below.

Generally, in the case where a user inputs a character by handwriting, it is considered that a new stroke is rarely started on a line extending from a stroke immediately before the new stroke. Therefore, an ending point of each stroke is very likely to become a bending point of a trajectory.

Further, when a user writes a new stroke, it is considered that a finger linearly moves at a shortest distance from an ending point of a stroke immediately before the new stroke to a starting point of the new stroke. Therefore, it is considered that a bending point of a trajectory is not likely to be formed between the ending point of the stroke immediately before the new stroke and the starting point of the new stroke.

From the viewpoint described above, it is predicted that an ending point of each stroke becomes a bending point immediately before a starting point of a subsequent stroke. Therefore, in the embodiment, the extractor 3 obtains the bending point $P_i'$ as an ending point corresponding to the detection position $P_i$.

Figure 13:
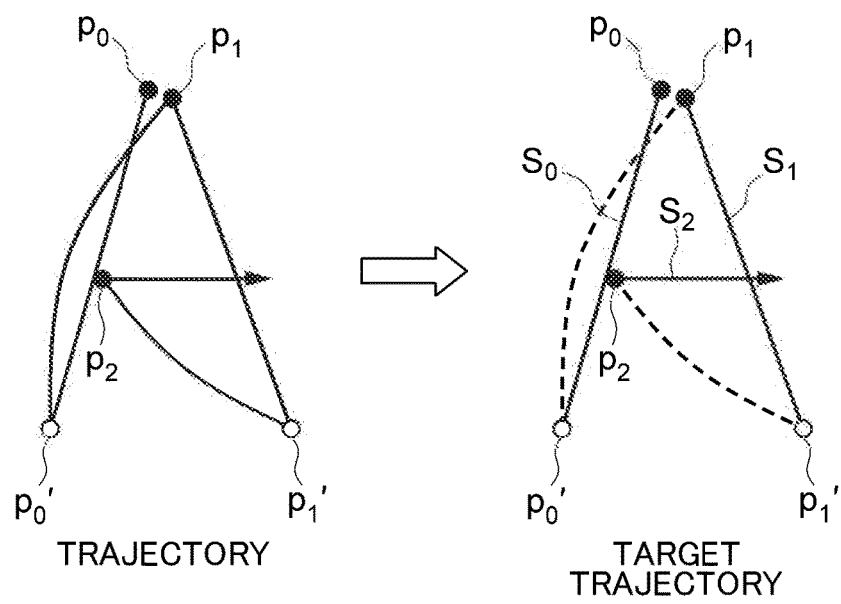
FIG. 13 is diagrams describing a method for extracting a target trajectory.

For example, in the case where a user inputs A of the alphabets by handwriting, it is predicted that a trajectory as illustrated in FIG. 13 is generated from the above viewpoint. In FIG. 13, positions $p_0$, $p_1$, and $p_2$ are detection positions at which user's finger comes into contact with an operation surface. The positions $p_0'$ and $p_1'$ are bending points immediately before the positions $p_1$ and $p_2$ respectively.

From a trajectory illustrated in FIG. 13, target trajectories $S_0$, $S_1$, and $S_2$ indicated by solid lines in FIG. 13 can be extracted by extracting a trajectory from the detection positions $P_i$ to the bending point $P_i'$ as a target trajectory. As illustrated in FIG. 13, the target trajectories $S_0$, $S_1$, and $S_2$ correspond to strokes actually input on an operation surface by a user. Broken lines in FIG. 13 correspond to a trajectory (a back stroke) generated when user's finger moves at a position away from an operation surface.

In the case where a user inputs a character by handwriting, a bending point might not be formed on a target trajectory corresponding to the last stroke. For example, a bending point as an ending point might not be obtained on the target trajectory $S_2$ illustrated in FIG. 13. Even in such a case, the extractor 3 can obtain an ending point of a target trajectory by using the following method.

The extractor 3, for example obtains the finger position p after a predetermined time $T_4$ from the time of a starting point (the detection time T) as an ending point of a target trajectory. The predetermined time $T_4$ can be arbitrarily set.

Further, the extractor 3 may obtain the finger position p when stop is detected immediately after the detection time T as an ending point. The stop means that a finger trajectory is included within a predetermined range for a predetermined time $T_5$ or more. The predetermined time $T_5$ can be arbitrarily set.

Further, the extractor 3 may obtain an end signal input by handwriting and may obtain, as an end point, the finger position p when the end signal is obtained or immediately therebefore. The end signal may be input by pressing a predetermined button by a user and may be input by a predetermined gesture. For example, a gesture command input by tapping a predetermined position and flicking a predetermined direction and distance by a user can be used as an end signal.

Furthermore, the extractor 3 may obtain, as an ending point, the position p at which a likelihood of a character of a target trajectory and a likelihood of a character when combined with other target trajectory are maximized on a trajectory after a starting point.

The determiner 4 determines a character input by user's gesture based on a target trajectory and outputs a determination result. The determiner 4 can determine characters, for example, by using a general handwriting character recognition technique and a handwriting figure recognition technique.

Specifically, the determiner 4 first calculates a likelihood of a character in which one or multiple target trajectories are combined. Next, the determiner 4 compares the calculated likelihood and a threshold of the likelihood set to a character. The determiner 4 determines combination of a target trajectory as a character corresponding to the threshold in the case where the calculated likelihood exceeds the threshold.

In the case where a specific character string is detected, the determiner 4 may output a command (an order and characters) depending on the character string. Herein, the character string includes a specific character and figure and a combination thereof. Further, the determiner 4 may output a different command depending on an input method in the case where characters are input one by one by handwriting (overwriting) by using a palm as an operation surface and in the case where multiple characters are continuously input side by side.

Figure 14:
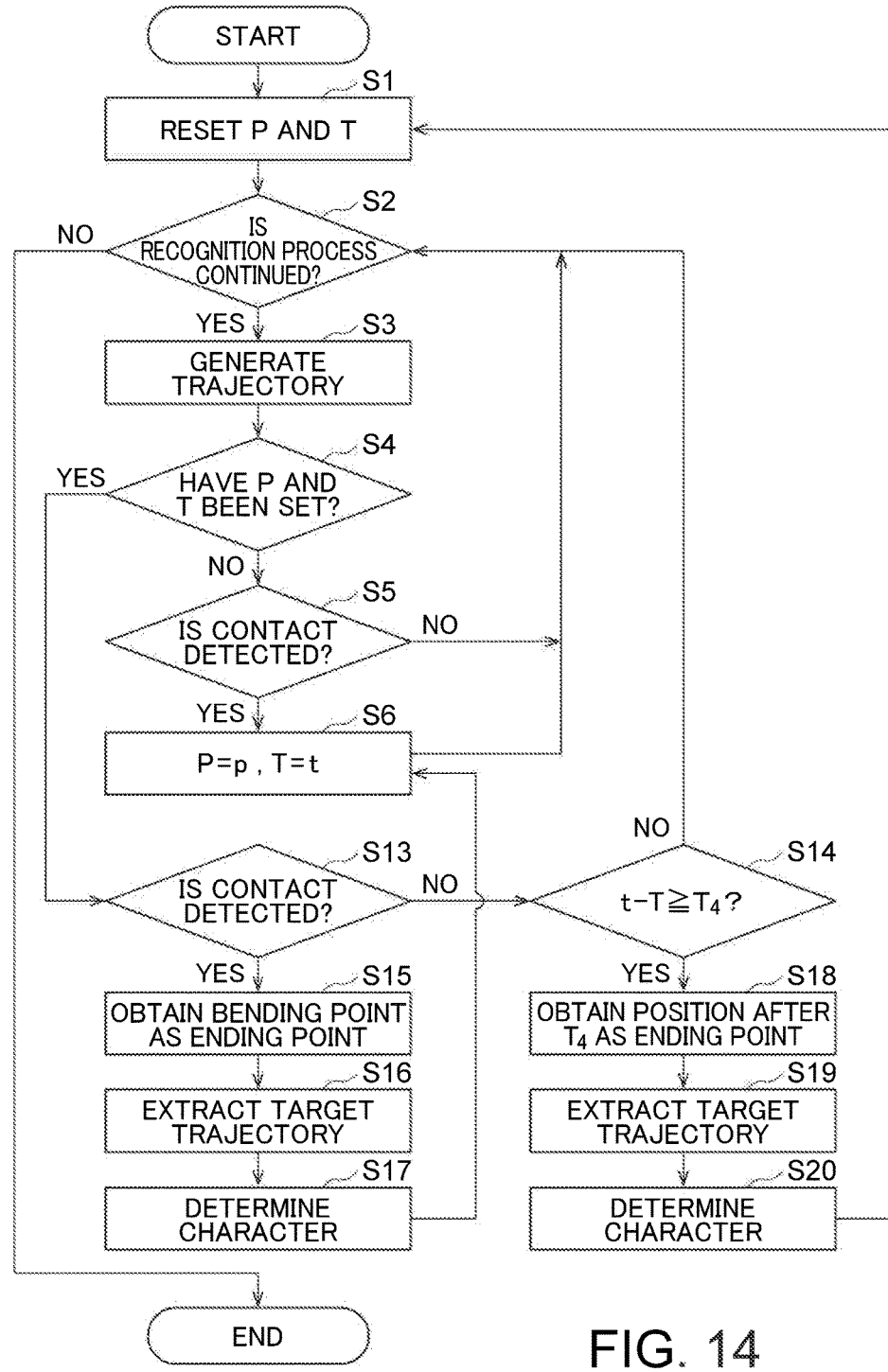
FIG. 14 is a flowchart illustrating processing of a recognition device according to a second embodiment.

Next, processing of the recognition device according to the embodiment will be specifically described with reference to FIGS. 14 and 15. FIG. 14 is a flowchart illustrating processing of the recognition device according to the embodiment. In FIG. 14, steps S1 to S6 are similar to the steps illustrated in FIG. 10. The case will be described below where the extractor 3 obtains, as an ending point, a bending point or a finger position p after a predetermined time $T_4$ from a starting point. However, as described above, a method for obtaining an ending point is not limited thereto.

In the embodiment, in the case where the detection position P and the detection time T are already set when the generator 1 generates a trajectory (YES in step S4), the process proceeds to step S13.

In step S13, the detector 2 determines whether a finger comes into contact with an operation surface. A method for detecting the contact is as described above. In the case where the detector 2 does not detect the contact (NO in step S13), the process proceeds to step S14.

In step S14, the extractor 3 obtains the detection position P and the detection time T as a starting point of a target trajectory from the detector 2. The extractor 3 determines whether a time from the detection time T to a current time t (t−T) is equal to or greater than the predetermined time $T_4$. In the case of less than the predetermined time $T_4$, in other words, in the case of t−T<$T_4$ (NO in step S14), the process returns to step S2.

In step S13, in the case where the detector 2 detects contact (YES in step S13), the process proceeds to step S15.

In step S15, the extractor 3 obtains, as an ending point, the bending point P' immediately before a finger position (subsequent detection position) when the contact is detected in step S13. A method for obtaining a bending point is as described above.

In step S16, the extractor 3 extracts, as a target trajectory, a trajectory from a starting point to an ending point, specifically, a trajectory from the detection position P to the bending point P'.

In step S17, the determiner 4 obtains a target trajectory from the extractor 3, determines a character, and outputs a determination result. More specifically, the determiner 4 stores a target trajectory obtained from the extractor 3, and determines a character input by handwriting based on one or multiple stored target trajectories.

Then, the process returns to step S6. In step S6, from the generator 1, the detector 2 obtains, as the detection time T, a time t at which the contact has been detected in step S13 (T=t) and obtains the position p at the time t as the detection position P (P=p). In this manner, the detection position P and the detection time T are updated.

The detection position P and the detection time T are updated after step S17, because it is predicted that an input by a user is continued since contact has been detected in step S13.

In step S14, in the case of the predetermined time $T_4$ or more, in other words, in the case of t−T≥$T_4$ (YES in step S14), the process proceeds to step S18.

In step S18, from the generator 1, the extractor 3 obtains the position p after the predetermined time $T_4$ from the detection time T as an ending point of a target trajectory and extracts a trajectory from the detection position P to the obtained position p as a target trajectory. In this case, the extractor 3 may obtain the position p at a current time instead of the position p after the predetermined time $T_4$ from the detection time T.

In step S19, the extractor 3 extracts, as a target trajectory, a trajectory from a starting point to an ending point, specifically, a trajectory from the detection position P to the position p after the predetermined time $T_4$ from the detection time T.

In step S20, the determiner 4 obtains a target trajectory from the extractor 3, determines a character, and outputs a determination result. More specifically, the determiner 4 stores a target trajectory obtained from the extractor 3, and determines a character input by handwriting based on one or multiple stored target trajectories.

Then, the process returns to step S1, and the detection position P and the detection time T are reset. The detection position P and the detection time T are reset after step S20, because it is predicted that an input by a user has been finished since subsequent contact is not detected for the predetermined time $T_4$ or more after contact has been detected.

A recognition device recognizes a gesture of a user by repeating the above process at a predetermined time interval and determines a character input by the user.

Herein, processing of the recognition device in the case where a user inputs A of the alphabets will be specifically described with reference to FIG. 15. Hereinafter, it is assumed that contact is not detected after a user inputs a target trajectory $S_2$.

First, when a finger comes into contact with an operation surface at a finger position $p_0$, contact is detected (YES in step S5) and the position $p_0$ is set to the detection position P (step S6). After that, processes in steps S2 to S4, S13, and S14 are repeated until a finger comes into contact with an operation surface at a finger position $p_1$. In this manner, as illustrated in FIG. 15, a trajectory from the position $p_0$ to the position $p_1$ is generated.

When a finger comes into contact with an operation surface at the position $p_1$, contact is detected (YES in step S13), a bending point $p_0'$ immediately before the position $p_1$ is obtained as an ending point (step S15), and the target trajectory $S_0$ is extracted (step S16).

The determiner 4 determines a character based on the target trajectory $S_0$ (step S17). The determiner 4, for example, outputs candidates of a character predicted from the target trajectory $S_0$ as a determination result and a determination result that determination is not possible.

Then, the detection position P is updated to the position $p_1$ (step S6). After that, processes in steps S2 to S4, S13, and S14 are repeated until a finger comes into contact with an operation surface at a finger position $p_2$. In this manner, as illustrated in FIG. 15, a trajectory from the position $p_1$ to the position $p_2$ is generated.

When a finger comes into contact with an operation surface at the position $p_2$, contact is detected (YES in step S13), a bending point $p_1'$ immediately before the position $p_2$ is obtained as an ending point (step S15), and the target trajectory $S_1$ is extracted (step S16).

The determiner 4 determines a character based on the target trajectories $S_0$ and $S_1$ (step S17). The determiner 4, for example, outputs candidates of a character predicted from the target trajectories $S_0$ and $S_1$ as a determination result and a determination result that determination is not possible.

Then, the detection position P is updated to the position $p_2$ (step S6). After that, processes in steps S2 to S4, S13, and S14 are repeated until the predetermined time $T_4$ passes. In this manner, as illustrated in FIG. 15, a trajectory after the position $p_2$ is generated.

When the predetermined time $T_4$ passes after the position $p_2$ is set to the detection position P (YES in step S14), the position p after a predetermined time $T_4$ from the detection time T is obtained as an ending point (step S18), and the target trajectory $S_2$ is extracted (step S19).

The determiner 4 determines a character based on the target trajectories $S_0$ to $S_2$ (step S20). The determiner 4 determines A as a character and outputs a determination result.

Then, the detection position P and the detection time T are reset (step S1). After that, processes in steps S2 to S5 are repeated until new contact is detected.

In the above description, although the determiner 4 determines a character every time a target trajectory is extracted, a timing at which the determiner 4 determines a character can be arbitrarily set. The determiner 4 may determine a character, for example, in the case where a predetermined number of target trajectories is extracted.

As described above, according to the recognition device according to the embodiment, a character input by a user by handwriting can be determined (a gesture can be recognized) by generating a finger trajectory of the user and detecting that user's finger comes into contact with an operation surface. Specifically, the recognition device can determine a character without detecting that user's finger is separated from the operation surface. Therefore, the recognition device according to the embodiment can prevents incorrectly detecting a stroke of a character by incorrectly detecting separation of a finger and can precisely determine the character.

Figure 16:
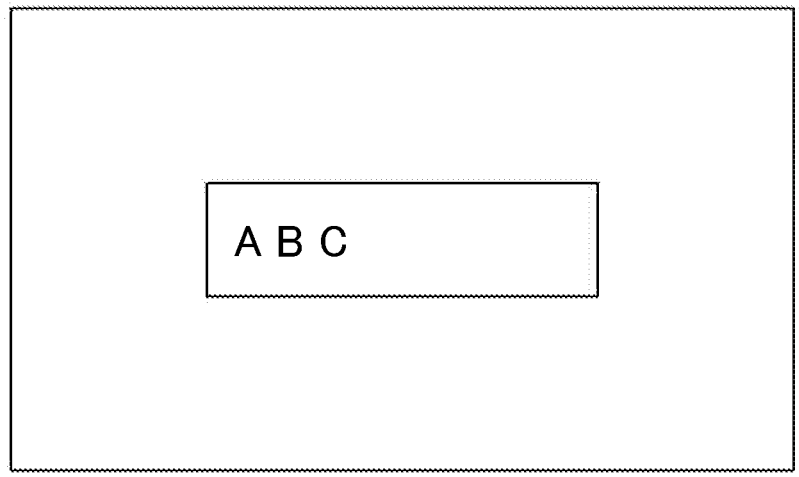
FIG. 16 illustrates an example of a screen of the recognition device according to the second embodiment.

The recognition device according to the embodiment can be used as a device capable of handwriting input of a character by a gesture (for example, TV and a computer). FIG. 16 is a diagram illustrating an example of a screen displayed on a display device 103 of the recognition device. A character string ABC is input on a screen illustrated in FIG. 16. According to the recognition device according to the embodiment, as illustrated in FIG. 16, a character can be input by handwriting in a text box on the screen or the like.

Further, in the embodiment, the display device 103 may display a trajectory generated by the generator 1 and a target trajectory extracted by the extractor 3. The target trajectory may be displayed every time it is extracted and may be displayed in real time including a process of the extraction as illustrated in FIG. 15.

Figure 15:
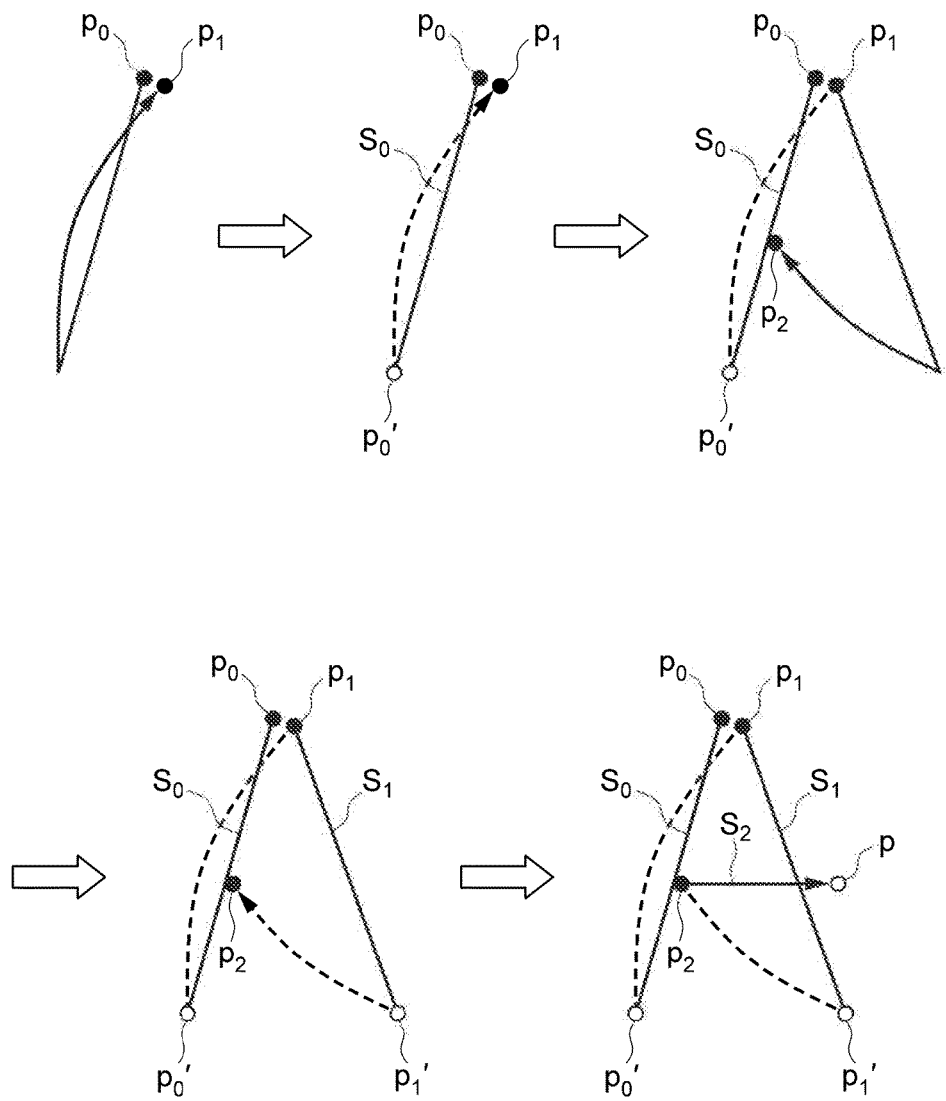
FIG. 15 is diagrams describing processing of the recognition device according to the second embodiment.

In the case of displaying a target trajectory on the display device 103, user's stroke (target trajectory) and a back stroke are preferably displayed by a solid line and a broken line as illustrated in FIG. 15 or by different colors.

Third Embodiment

A recognition device, method, and storage medium according to a third embodiment will be described with reference to FIGS. 17 to 20. The recognition device according to the embodiment determines characters input by user's gesture as with the second embodiment. The recognition device according to the embodiment is different from that of the second embodiment in that separation of a finger is detected instead of detecting contact of a finger. Hereinafter, a command is assumed to be a character. However, it may be a figure as described above.

Figure 17:
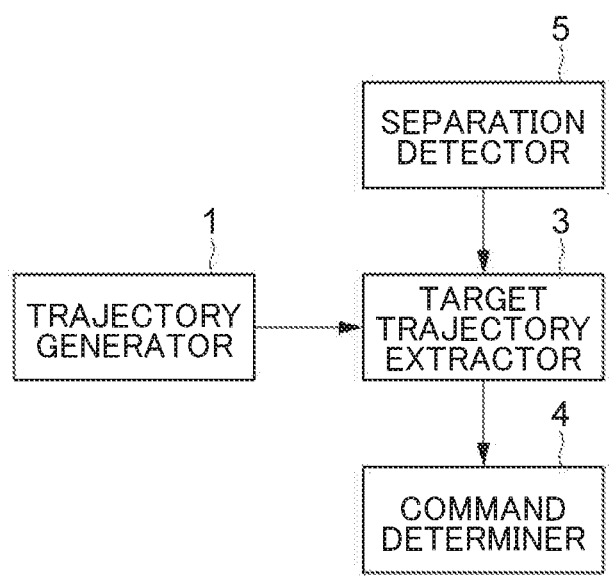
FIG. 17 is a block diagram illustrating a function configuration of a recognition device according to a third embodiment.

First, a function configuration of the recognition device according to the embodiment will be described with reference to FIGS. 17 and 18. FIG. 17 is a block diagram illustrating a function configuration of the recognition device according to the embodiment. As illustrated in FIG. 17, the recognition device according to the embodiment includes a separation detector 5 instead of a detector 2. Further, an extraction method by an extractor 3 is different from that of the second embodiment. The separation detector 5 and the extractor 3 will be described below. Other function configuration and hardware configuration are similar to those of the first embodiment.

The separation detector 5 (hereinafter called a detector 5) detects that a finger, which has contacted an operation surface, separates from the operation surface. The detector 5, for example, detects contact based on sensor data of pressure sensors attached to and around a finger. Specifically, the detector 5 detects the separation by comparing an output value of the pressure sensors with a predetermined threshold or by comparing a pattern of output waveforms with the pattern while separating. In this case, the recognition device may obtain sensor data by communicating with the pressure sensors and may include the pressure sensors.

In addition, the detector 5 may detect contact based on movement information. For example, the detector 5 detects separation by detecting from sensor data of a movement information sensor that a finger has moved in a direction separating from an operation surface.

Further, in the case where a user inputs a block-style character, a finger probably stops at an ending point of a stroke. Therefore, the detector 5 may detect separation by detecting stop of a finger.

When separation is detected, the detector 5 obtains a time t at which the separation has been detected and a finger position p at the time t from the generator 1 as the detection time T and the detection position P.

The extractor 3 obtains the detection position P from the detector 5 as an ending point of a target trajectory. The extractor 3 obtains a starting point corresponding to the ending point after the ending point of the target trajectory has been obtained. The extractor 3 extracts, as a target trajectory, a trajectory from the starting point to the ending point from a trajectory generated by the generator 1. The starting point corresponding to the ending point is a starting point of a target trajectory ending at the ending point. In the embodiment, a target trajectory is handled as a stroke of a character input by handwriting.

The extractor 3, for example, obtains a starting point of a target trajectory based on a direction of a trajectory before an ending point. Specifically, the extractor 3 obtains, as a starting point corresponding to an ending point, a bending point $P_i'$ of a trajectory immediately after a detection position $P_{i-1}$ before a detection position $P_i$ obtained as an ending point. The reason therefor is as described below.

Generally, in the case where a user inputs a character by handwriting, it is considered that a new stroke is rarely started on a line extending from a stroke immediately before the new stroke. Therefore, a starting point of each stroke is very likely to become a bending point of a trajectory.

Further, when a user writes a new stroke, it is considered that a finger linearly moves from an ending point of a stroke immediately before the new stroke to a starting point of the new stroke. Therefore, a bending point of a trajectory between the ending point of the stroke immediately before the new stroke and the starting point of the new stroke is not likely to be formed.

From the viewpoint described above, it is predicted that a starting point of each stroke becomes a bending point immediately after an ending point of a subsequent stroke. Therefore, in the embodiment, the extractor 3 obtains the bending point $P_i'$ as a starting point corresponding to the detection position $P_i$.

Figure 18:
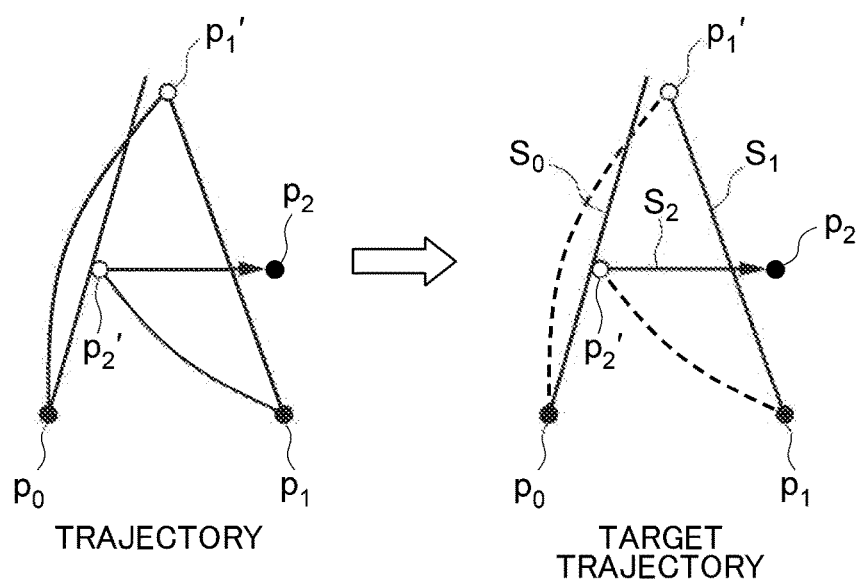
FIG. 18 is diagrams describing a method for extracting a target trajectory.

For example, in the case where a user inputs A of the alphabets by handwriting, it is predicted that a trajectory as illustrated in FIG. 18 is generated from the above viewpoint. In FIG. 18, positions $p_0$, $p_1$, and $p_2$ are detection positions at which user's finger separates from an operation surface. The positions $p_1'$ and $p_2'$ are bending points immediately after the positions $p_0$ and $p_1$ respectively.

In the case where a user inputs a character by handwriting, a bending point might not be formed on a target trajectory corresponding to the first stroke. For example, a bending point might not be obtained as a starting point on the target trajectory $S_0$ illustrated in FIG. 18. Even in such a case, the extractor 3 can obtain a starting point of a target trajectory by applying the following method.

The extractor 3, for example, obtains the finger position p before a predetermined time $T_6$ from a time of an ending point (the detection time T) as a starting point of a target trajectory. The predetermined time $T_6$ can be arbitrarily set.

Further, the extractor 3 may obtain the finger position p when stop of a finger is detected immediately before the detection time T as a starting point.

Further, the extractor 3 may obtain a start signal of handwriting input and obtain, as a starting point, a finger position when the start signal has been obtained or immediately thereafter. The start signal may be input by pressing a predetermined button by a user and may be input by a predetermined gesture. For example, a gesture command input by tapping a predetermined position and flicking a predetermined direction and distance by a user can be used as a start signal.

Furthermore, the extractor 3 may obtain, as a starting and ending point, the position p at which a likelihood of a character of a target trajectory and a likelihood of a character when combined with other target trajectory are maximized on a trajectory before an ending point.

Figure 19:
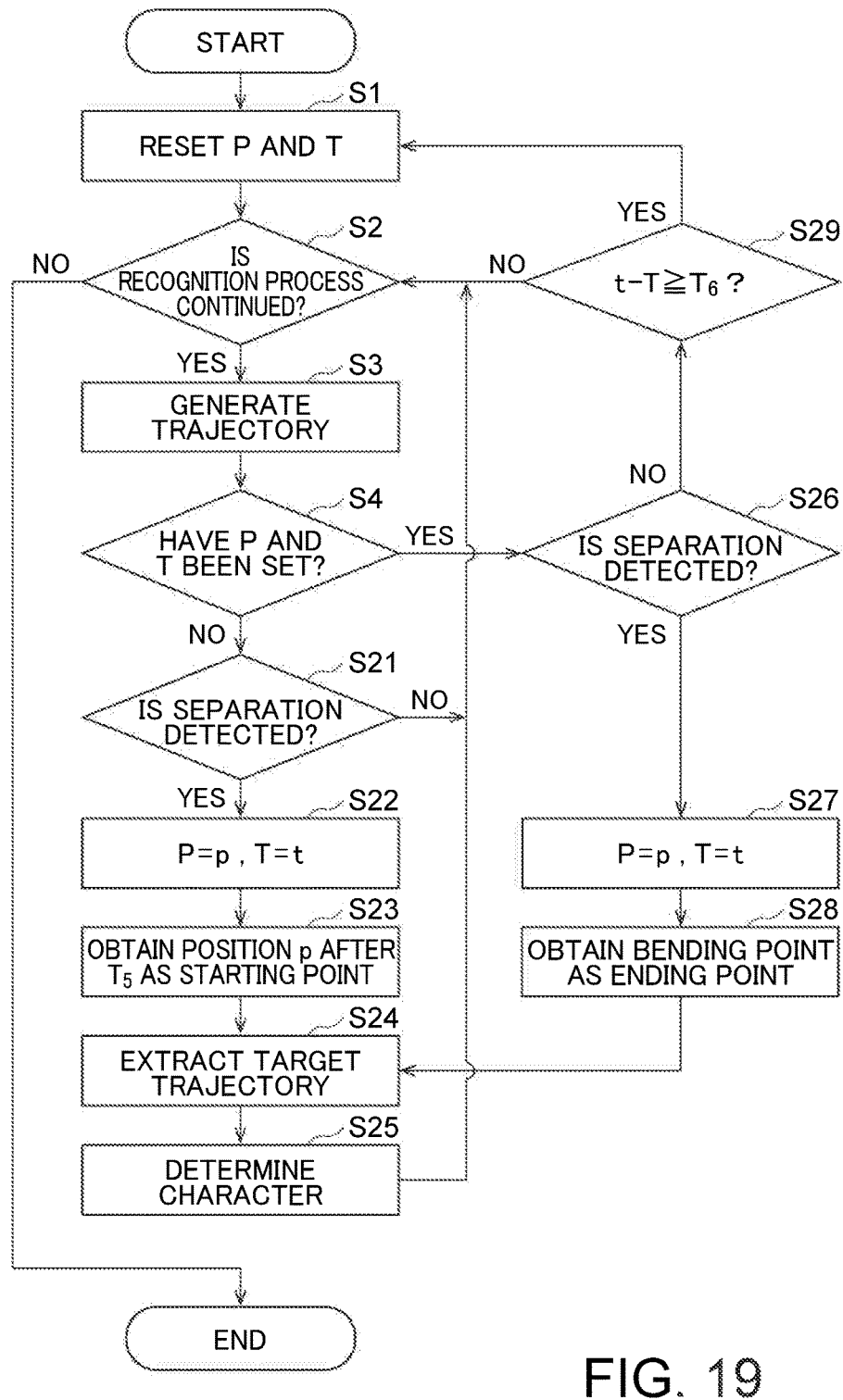
FIG. 19 is a flowchart illustrating processing of the recognition device according to the third embodiment.
Figure 20:
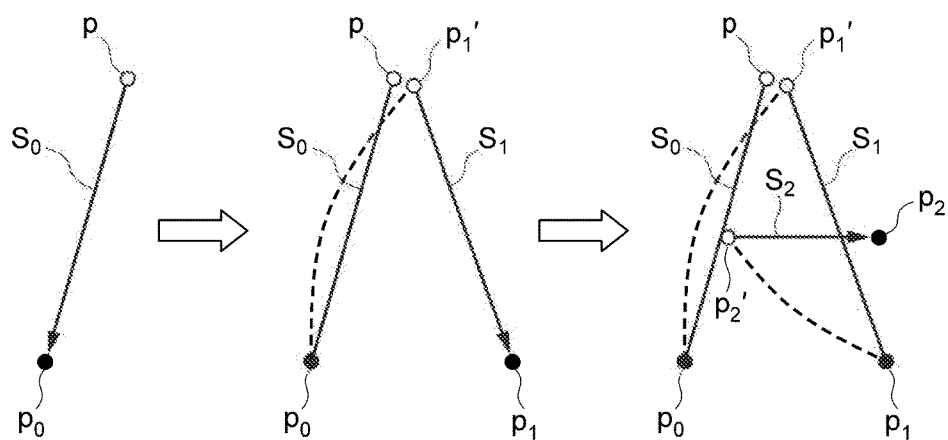
FIG. 20 is diagrams describing processing of the recognition device according to the third embodiment.

Next, processing of the recognition device according to the embodiment will be specifically described with reference to FIGS. 19 and 20. FIG. 19 is a flowchart illustrating processing of the recognition device according to the embodiment. In FIG. 19, steps S1 to S4 are similar to the steps illustrated in FIG. 10. The case will be described below where the extractor 3 obtains, as a starting point, a bending point or a finger position p before a predetermined time $T_6$ from the detection time T. However, as described above, a method for obtaining a starting point is not limited thereto.

In the embodiment, in the case where the detection position P and the detection time T are already set when the generator 1 generates a trajectory (YES in step S4), the process proceeds to step S21.

In step S21, the detector 5 determines whether a finger separates from an operation surface. A method for detecting the separation is as described above. In the case where the detector 5 does not detect the separation (NO in step S21), the process returns to step S2.

In the case where the detector 5 detects the separation (YES in step S21) in step S21, the process proceeds to step S22.

In step S22, from the generator 1, the detector 5 obtains a time t, at which the separation has been detected, as the detection time T (T=t) and obtains the position p at the time t as the detection position P (P=p). In this manner, the detection position P and the detection time T are set.

In step S23, the extractor 3 obtains the detection position P from the detector 5 as an ending point of a target trajectory. The extractor 3 obtains a finger position p before a predetermined time $T_5$ from the detection time T as a starting point of a target trajectory from the generator 1.

In step S24 from a trajectory generated by the generator 1, the extractor 3 extracts, as a target trajectory, a trajectory from a starting point to an ending point, specifically, a trajectory from the position p before the predetermined time $T_5$ from the detection time T to the detection position P.

In step S25, the determiner 4 obtains a target trajectory from the extractor 3, determines a character, and outputs a determination result. More specifically, the determiner 4 stores a target trajectory obtained from the extractor 3, and determines a character input by handwriting based on one or multiple stored target trajectories. Then, the process returns to step S2.

In the case where the detection position P and the detection time T are already set when the generator 1 generates a trajectory (YES in step S4), the process proceeds to step S26.

In step S26, the detector 5 determines whether a finger separates from an operation surface. A method for detecting the separation is as described above. In the case where the detector 5 detects separation (YES in step S26), the process proceeds to step S27.

In step S27, from the generator 1, the detector 5 obtains a time t, at which the separation has been detected, as the detection time T (T=t) and obtains the position p at the time t as the detection position P (P=p). In this manner, the detection position P and the detection time T are updated.

In step S28, the extractor 3 obtains the detection position P from the detector 5 as an ending point of a target trajectory. The extractor 3 obtains a bending point P' immediately after a detection position before the detection position P as a starting point of a target trajectory. A method for obtaining the bending point P' is as described above. Then, the process proceeds to step S24.

In step S26, in the case where the detector 5 does not detect separation (NO in step S21), the process proceeds to step S29.

In step S29, the detector 5 determines whether a time from the detection time T to a current time t (t−T) is equal to or greater than a predetermined time $T_6$. The predetermined time $T_6$ is a time to determine whether input by a user is finished and can be arbitrarily set.

In the case where of less than the predetermined time $T_6$, in other words, in the case of $t-T<T_6$ (NO in step S29), the process returns to step S2. This is because input by a user might be continued since an elapsed time since the separation has been detected is short.

In the case of the predetermined time $T_6$ or more, in other words, in the case of $t-T \geq T_6$ (YES in step S29), the process returns to step S1, and the detection position P and the detection time T are reset. This is because it is predicted that input by a user is finished because an elapsed time since the separation has been detected is long.

A recognition device recognizes a gesture of a user by repeating the above processing at a predetermined time interval and determines a character input by the user.

Herein, processing of the recognition device in the case where a user inputs A of the alphabets will be specifically described with reference to FIG. 20. Hereinafter, it is assumed that separation is not detected before a user inputs the target trajectory $S_0$.

Processes in steps S2 to S4, and S21 are repeated until a finger separates from an operation surface at the position $p_0$. In this manner, a trajectory to the position $p_0$ is generated.

When the finger separates from the operation surface at the position $p_0$, separation is detected (YES in step S21) and the position $p_0$ is set to the detection position P (step S22). Then, the position p before the predetermined time $T_6$ from the detection time T is obtained as a starting point (step S23), and the target trajectory $S_0$ is extracted (step S24).

The determiner 4 determines a character based on the target trajectory $S_0$ (step S25). The determiner 4, for example, outputs candidates of a character predicted from the target trajectory $S_0$ as a determination result and a determination result that determination is not possible.

After that, processes in steps S2 to S4, S26 and S29 are repeated until a finger separates from an operation surface at the position $p_1$.

When the finger separates from the operation surface at the position $p_1$, separation is detected (YES in step S26) and the position $p_1$ is set to the detection position P (step S27). Then, a bending point $p_1'$ immediately after the position $p_0$ which is a previous detection position is obtained as a starting point (step S28), and a target trajectory $S_1$ is extracted (step S24).

The determiner 4 determines a character based on the target trajectories $S_0$ and $S_1$ (step S25). The determiner 4, for example, outputs candidates of a character predicted from the target trajectories $S_0$ and $S_1$ as a determination result and a determination result that determination is not possible.

After that, processes in steps S2 to S4, S26 and S29 are repeated until a finger separates from an operation surface at the position $p_2$.

When the finger separates from the operation surface at the position $p_2$, separation is detected (YES in step S26), and the position $p_2$ is set to the detection position P (step S27). Then, a bending point $p_2'$ immediately after the position $p_1$ which is a previous detection position is obtained as a starting point (step S28), and the target trajectory $S_2$ is extracted (step S24).

The determiner 4 determines a character based on the target trajectories $S_0$ to $S_2$ (step S25). The determiner 4 determines A as a character and outputs a determination result.

After that, processes in steps S2 to S4, S26, and S29 are repeated until the predetermined time $T_6$ passes from the detection time T. When the predetermined time $T_6$ passes from the detection time T (YES in step S29), the process returns to step S1, and the detection position P and the detection time T are reset.

As described above, according to the recognition device according to the embodiment, a character input by a user by handwriting can be determined (a gesture can be recognized) by generating a finger trajectory of the user and detecting that the user's finger separates from an operation surface. Specifically, the recognition device can determine a character without detecting that user's finger comes into contact with an operation surface. Therefore, the recognition device according to the embodiment can prevent incorrectly detecting a stroke of a character by incorrectly detecting contact of a finger and can precisely determine the character.

The recognition device according to the embodiment can be used as a device (for example, TV and a computer) capable of handwriting input of a character by a gesture as with the second embodiment.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A recognition device, comprising:
a memory; and
a hardware processor that:
    generates a trajectory of a pointer based at least in part on information relating to a movement of the pointer;
    detects that the pointer contacts an operation surface, determines a detection time when the pointer contacts the operation surface, and determines a detection position of the pointer at the detection time;
    sets the detection position as a starting point, determines an ending point on the operation surface corresponding to the starting point based on at least the detection time or the detection position without detecting that the pointer separates from the operation surface, and sets the trajectory from the starting point to the ending point as a target trajectory; and
    determines a command input by a user with a gesture of the pointer based on the target trajectory.

2. The device according to claim 1, wherein the hardware processor determines a gesture command input by the user based on the target trajectory.

3. The device according to claim 2, wherein the hardware processor sets a position of the pointer after a particular time elapses from the detection time as the ending point.

4. The device according to claim 2, wherein the hardware processor sets a position of the pointer at a particular distance from the detection position as the ending point.

5. The device according to claim 2, wherein the hardware processor determines as the ending point a second detection position subsequent to the detection position set as the starting point.

6. The device according to claim 2, wherein the hardware processor determines the gesture command as a flick command in a case where a distance from the starting point to the ending point is equal to or greater than a particular distance.

7. The device according to claim 2, wherein the hardware processor determines the gesture command as a tap command in a case where an elapsed time from a time of the starting point to a time of the ending point is equal to or greater than a particular time.

8. The device according to claim 1, wherein the hardware processor determines at least a character or a figure input by the user based on the target trajectory.

9. The device according to claim 8, wherein the hardware processor determines as the ending point a bending point of the trajectory before the detection position subsequent to the detection position set as the starting point.

10. The device according to claim 8, wherein the hardware processor determines as the ending point a position of the pointer after a particular time from the detection time.

11. The device according to claim 8, wherein the hardware processor determines as the ending point a position of the pointer when a stop of the pointer is detected after the detection time.

12. The device according to claim 8, wherein the hardware processor determines as the ending point a position of the pointer when an end signal input from the user is obtained.

13. The device according to claim 1, wherein the hardware processor detects, based on the information relating to the movement of the pointer, that the pointer has contacted the operation surface.

14. A recognition device comprising:
a memory;
a hardware processor that:
    generates a trajectory of a pointer based at least in part on information relating to a movement of the pointer;
    detects that the pointer separates from an operation surface, determines a detection time when the pointer separates from the operation surface, and determines a detection position of the pointer at the detection time;
    sets the detection position as an ending point, determines a starting point on the operation surface corresponding to the ending point based on a direction of the trajectory without detecting that the pointer contacts the operation surface, and sets the trajectory from the starting point to the ending point as a target trajectory; and determines at least a character or a figure input by a user with a gesture of the pointer based on the target trajectory.

15. The device according to claim 14, wherein the hardware processor determines as the starting point a bending point of the trajectory after a second detection position before the detection position set as the ending point.

16. The device according to claim 14, wherein the hardware processor determines as the starting point a position of the pointer before a particular time from the detection time.

17. The device according to claim 14, wherein the hardware processor determines as the starting point a position of the pointer when a stop of the pointer is detected before the detection time.

18. The device according to claim 14, wherein the hardware processor determines as the starting point a position of the pointer when a start signal input from the user is obtained.

19. A recognition method, comprising:
- generating a trajectory of a pointer based at least in part on information relating to a movement of the pointer;
- detecting that the pointer contacts an operation surface, determining a detection time when the pointer contacts the operation surface, and determining a detection position of the pointer at the detection time;
- sets the detection position as a starting point, determining an ending point on the operation surface corresponding to the starting point based on at least the detection time or the detection position without detecting that the pointer separates from the operation surface, and setting the trajectory from the starting point to the ending point as a target trajectory; and
- determining a command input by a user with a gesture of the pointer based on the target trajectory.

20. A non-transitory storage medium storing a computer readable recognition program for causing the computer to execute a process, comprising:
- generating a trajectory of a pointer based at least in part on information relating to a movement of the pointer;
- detecting that the pointer contacts an operation surface, determining a detection time when the pointer contacts the operation surface, and determining a detection position of the pointer at the detection time;
- setting the detection position as a starting point, determining an ending point on the operation surface corresponding to the starting point based on at least the detection time or the detection position without detecting that the pointer separates from the operation surface, and setting the trajectory from the starting point to the ending point as a target trajectory; and
- determining a command input by a user with a gesture of the pointer based on the target trajectory.

* * * * *